Oct. 23, 1956　　　G. C. CROWLEY ET AL　　　2,768,273
HEATING DEVICE CONTROL CIRCUIT
Filed Dec. 30, 1954
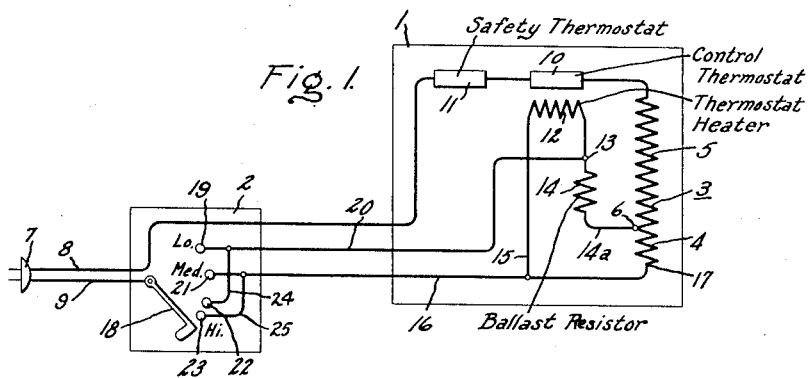
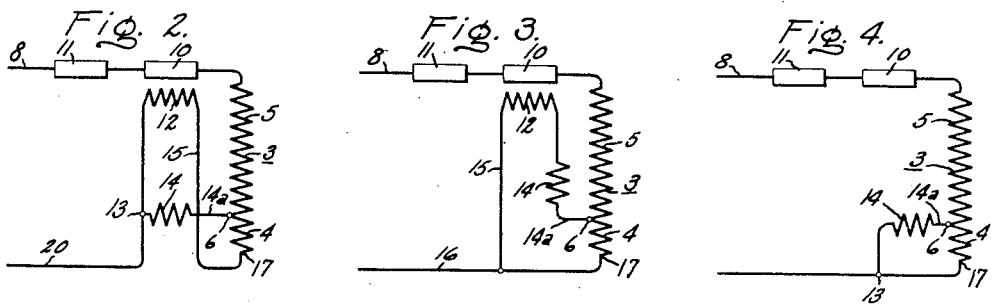
Inventors:
George C. Crowley,
Robert A. Wise,
by Frank L. Neuhauser
Their Attorney.

United States Patent Office 2,768,273
Patented Oct. 23, 1956

2,768,273

HEATING DEVICE CONTROL CIRCUIT

George C. Crowley and Robert A. Wise, Asheboro, N. C., assignors to General Electric Company, a corporation of New York Application December 30, 1954, Serial No. 478,844

4 Claims. (Cl. 219—20)

Our invention relates to improvements in electric circuits and controls therefor and more particularly to improvements in circuits and controls for heating devices, such as heating pads and the like.

In various heating devices it is desirable to obtain selectively several temperature settings. By way of example, in heating pads, it is customary to provide a plurality of different settings by which the pad may be operated at any of several selected temperatures. This is sometimes accomplished by providing a heater adjacent the controlling thermostat and varying the current to the heater so as to vary the amount of heat supplied thereby to the thermostat. In this way the temperature of the heating pad at which the thermostat heater raises the temperature of the control thermostat to its cut-off point may be varied.

In accordance with our invention a circuit is provided in connection with the thermostat heater whereby the energy to the heater may be widely varied so as to obtain a wide spread between the temperatures for which the heating device may be set. Further, this is accomplished with a selector switch and circuit connection which requires only three wires from the remotely located selector switch to the heating pad.

It is an object of our invention to provide an electric circuit and control therefor for securing a plurality of different temperature settings for a heating device.

It is another object of our invention to provide an electric circuit and control therefor whereby a wide range of temperature settings of a heating device is secured.

It is a further object of our invention to provide such wide range of temperature settings with a minimum of wires between the control and the heating device.

Other objects and advantages of our invention will become apparent as the following description proceeds and the features of novelty which characterize our invention will be pointed out with particularity in the claims annexed to and forming part of this specification.

For a better understanding of our invention reference may be had to the accompanying drawing in which:

Fig. 1 is a schematic wiring diagram of an embodiment of our invention applied to a heating pad.

Fig. 2 is a simplified diagram showing the active portions of the circuit at the low temperature setting.

Fig. 3 is a simplified diagram showing the active portions of the circuit at the medium temperature setting.

Fig. 4 is a simplified diagram showing the active portions of the circuit at the high temperature setting.

In carrying out the objectives of our invention, a ballast resistor is incorporated in the control circuit and a selector switch is connected to the circuit so that in one position a heater for the control thermostat and a portion of the heating element in series may be connected across the ballast resistor, in a second position the thermostat heater and the ballast resistor in series may be connected across this portion of the heating element, and in a third position the thermostat heater is shorted out of the circuit and the ballast resistor alone is connected across this portion of the heating element.

While it will be obvious as the description proceeds that our invention is applicable to a wide range of heating devices, for convenience it will be described in connection with one specific application, namely the controlling of the temperature of a heating pad.

Referring to the drawing, the heating pad is indicated diagrammatically by the rectangle 1 and the control or selector switch is indicated diagrammatically by the rectangle 2. The heating pad includes a heating element 3 which is formed of a first portion 4 and a second portion 5. Actually the heating element would in normal practice be one continuous resistance element, a tap simply being provided at the point 6 common to the portions 4 and 5 for affording connection of other portions of the circuit in accordance with our invention. In the diagrammatic illustration employed, the heating element has been merely shown extending along one edge of the pad but it will be obvious that in actual practice the heating element will be distributed in any suitable manner over the entire area of the pad.

Power is supplied to the heating pad from any suitable power source through a plug 7 and lines 8 and 9. The heating pad includes two thermostats 10 and 11. The thermostat 10 is the control thermostat which governs the temperature of the heating pad and the thermostat 11 is an over-temperature or safety thermostat to insure against any undesirably high temperature in the heating pad.

In order to vary the temperature of the heating pad by altering the response of the control thermostat 10, a heater 12 is provided generally adjacent the control thermostat 10. The thermostat heater 12 is connected as indicated at 13, to a ballast resistor 14. The series circuit including the thermostat heater 12 and the ballast resistor 14 is connected across the portion 4 of the heating element, one end of the ballast resistor 14 being connected to the junction or common point 6 of the two aforementioned portions 4 and 5 of the heating element 3 by a line 14a and one end of the auxiliary heater 12 being connected by a line 15 to a line 16 which is connected to the end 17 of the heating element 3.

In order to control the connection of the thermostat heater and the ballast resistor in the circuit in a plurality of combinations, a selector switch, indicated generally by the rectangle 2, is provided. This selector switch includes a manually movable switch arm, indicated diagrammatically at 18. The switch arm 18 may be moved to any one of three different temperature positions indicated respectively by "LO," "MED," and "HI" in Fig. 1. Normally a fourth, or "off," position is also provided. The low temperature terminal 19 of the switch is connected by a line 20 to the junction point 13 between the thermostat heater 12 and the ballast resistor 14. The terminal 21 of the medium temperature position is connected by the line 16 to the end 17 of the heating element 3. The auxiliary heater 12 is also connected, as indicated previously, by the line 15 to this line 16. The high temperature position of the switch includes two terminals 22 and 23 both of which are contacted by the switch arm 18 when it is in the high temperature setting. The terminal 22 is connected by line 24 to the line 20 which is also connected to the low temperature terminal 19. The terminal 23 is connected by a line 25 to the line 16 which is also connected to the medium temperature terminal 21.

The active circuit portions in the low, medium and high temperature positions are shown in simplified form in Figs. 2, 3 and 4 respectively. Thus referring to the low temperature circuit shown in Fig. 2, the line 9 is connected through the line 20 to the junction point 13 between the thermostat heater 12 and the ballast resistor 14. In this position of the switch, therefore, the thermostat heater 12 and the portion 4 of the heating element are connected in series across the ballast resistor 14. This allows a predetermined current to flow through the thermostat heater 12 ultimately causing the temperature of the control thermostat 10 to rise to its cut-off point at a particular temperature of the heating pad.

The active portions of the circuit in the medium temperature position are shown in Fig. 3. With the switch in the medium temperature position, the line 9 is connected through the line 16 to the end 17 of the heating element 3 and also through line 15 to one end of thermostat heater 12. The line 20 through which power was supplied to the junction point 13 of the thermostat heater 12 and the ballast resistor 14 in the low temperature setting is deenergized in the medium temperature setting. Accordingly, as shown in Fig. 3, in the medium temperature setting, the thermostat heater 12 and the ballast resistor 14 are connected in series across the portion 4 of the heating element. Because of the relative values of the resistances of the ballast resistor and the portion 4 of the heating element, a substantially reduced amount of current is supplied to the auxiliary heater 12 under this circuit connection, and accordingly a substantially higher temperature of the heating pad is reached before the control thermostat is brought to its cut-off temperature.

By way of example, in one form of our invention we have employed circuit elements having the following resistance values:

| | Ohms |
|---|---|
| Heating element portion 4 | 45 |
| Heating element portion 5 | 180 |
| Ballast resistor 14 | 80 |
| Thermostat heater 12 | 50 |

In the high temperature setting, as illustrated in Fig. 4, the thermostat heater 12 is entirely eliminated from the active circuit and only the ballast resistor 14 is connected across the portion 4 of the heating element. By reference to Fig. 1 it can be seen that when the switch arm 17 engages both contacts 22 and 23, a short is provided across the thermostat heater 12 so that it is effectively eliminated from the circuit. Since in the high temperature setting of Fig. 4 no heat is provided by the thermostat heater 12 to the control thermostat 10, a still higher temperature of the heating pad must be reached before the control thermostat is brought to its cut-off temperature.

With the resistance values given above by way of a specific example, we have obtained temperatures of approximately 135° F., 155° F., and 175° F. for the low, medium and high temperature settings, respectively. The thermostat heater was found to consume about three watts on the low heat position and about one watt in the medium heat position. No energy is, of course, consumed by the thermostat heater in high heat position.

While we have described our invention in connection with the heating pad as one specific embodiment, it will be apparent that the control circuit can be readily applied to other types of heating devices, and we intend, by the appended claims, to cover all modifications within the spirit and scope of our invention.

What we claim as new and desire to secure by Letters Patent of the United States is:

1. In an electric heating device and an electrical circuit therefor, a heating element including a first portion and a second portion, a thermostat for controlling said heating element, a thermostat heater for said thermostat, a ballast resistor within said heating device connected to said heating element at the common point of said portions, a selector switch remotely positioned with respect to said heating device for varying the temperature of said heating device, and a three conductor power supply and control cord connecting said selector switch to said heating device, said switch being movable to a first position for connecting said thermostat heater and said first portion of said heating element in series across said ballast resistor, movable to a second position for connecting said thermostat heater and said ballast resistor in series across said first portion of said heating element, and movable to a third position for eliminating said thermosat heater from the circuit.

2. In an electric heating device and an electrical circuit therefor, a heating element including a first portion and a second portion, a thermostat for controlling said heating element, a thermostat heater for said thermostat, a ballast resistor within said heating device connected to said heating element at the common point of said portions, a selector switch thermally isolated from said heating device for varying the temperature of said heating device, and a three conductor power supply and control cord connecting said selector switch to said heating device, said switch being movable to a first position for connecting said thermostat heater and said first portion of said heating element in series across said ballast resistor, movable to a second position for connecting said thermostat heater and said ballast resistor in series across said first portion of said heating element, and movable to a third position for connecting the ballast resistor alone across said first portion of said heating element.

3. In an electric heating device and an electrical circuit therefor, a heating element, a thermostat for controlling said heating element, a thermostat heater for said thermostat, a ballast resistor physically positioned within said heating device, a selector switch remotely located with respect to said heating device, electrical conducting means for power supply and control interconnecting said selector switch and said heating device, said ballast resistor and said thermostat heater being connected in series across a portion of said heating element for providing a predetermined current supply to said thermostat heater in one position of said selector switch, said selector switch being movable to a second position in which said thermostat heater is shorted, and being movable to a third position in which one side of the power supply is connected to the junction point of said ballast resistor and said thermostat heater whereby said thermostat heater and said portion of said heating element are placed in series across said ballast resistor.

4. In an electric heating device and an electrical circuit therefor, a heating element including a first portion and a second portion, a thermostat for controlling said heating element, a thermostat heater for said thermostat, a ballast resistor physically positioned within said heating device and electrically connected to said heating element at the common point of said portions, a selector switch remotely located with respect to said heating device for varying the temperature of said heating device, and electrical conducting means for power supply and control interconnecting said selector switch and said heating device, said switch being movable between one position in which said thermostat heater and said first portion of said heating element are connected in series across said ballast resistor and a second position in which said thermostat heater and said ballast resistor are connected in series across said first portion of said heating element.

References Cited in the file of this patent
UNITED STATES PATENTS

| 2,237,852 | Taylor | Apr. 8, 1941 |
| 2,452,622 | Youhouse | Nov. 2, 1948 |
| 2,579,926 | Johnson | Dec. 25, 1951 |
| 2,649,530 | Dietz | Aug. 18, 1953 |
| 2,705,276 | Wise | Mar. 29, 1955 |